United States Patent [19]

Weaver et al.

[11] Patent Number: 4,781,961

[45] Date of Patent: Nov. 1, 1988

[54] SEALING STRIP FOR DAMPER SYSTEM

[76] Inventors: Milo Weaver, Box 26, U.S. Rte. 62, Winesburg, Ohio 44690; Dean Miller, 1900 U.S. 62, Wilmot, Ohio 44689

[21] Appl. No.: 44,659

[22] Filed: May 1, 1987

[51] Int. Cl.⁴ .......... B32B 3/04; E06B 7/16

[52] U.S. Cl. .......... 428/122; 49/490; 49/491; 428/358

[58] Field of Search .......... 428/358, 122; 49/490, 49/491, 496

[56] References Cited

U.S. PATENT DOCUMENTS

| | | | |
|---|---|---|---|
| 3,665,646 | 5/1972 | Niemanns | 428/122 X |
| 4,007,536 | 2/1977 | Soderberg | 49/491 X |
| 4,472,469 | 9/1984 | Thies | 428/358 |
| 4,495,234 | 1/1985 | Tominaga et al. | 428/358 X |

FOREIGN PATENT DOCUMENTS

| | | | |
|---|---|---|---|
| 3300509 | 8/1983 | Fed. Rep. of Germany | 428/122 |
| 622038 | 1/1948 | United Kingdom | 49/490 |
| 702405 | 1/1954 | United Kingdom | 49/490 |
| 1522634 | 8/1978 | United Kingdom | 428/188 |
| 2127077 | 4/1984 | United Kingdom | 428/122 |
| 2153420 | 8/1985 | United Kingdom | 428/122 |

*Primary Examiner*—Lorraine T. Kendell
*Attorney, Agent, or Firm*—Renner, Kenner, Greive, Bobak, Taylor & Weber

[57] ABSTRACT

A sealing strip (10) for a vertically disposed damper (12) for the passage of air from a source to an output having a plurality of pivotal generally planar vanes (15) with a groove (27) at one periphery of the width thereof and a projecting flange (25) at the other periphery of the width thereof, each flange interfitting with the grooves of an adjacent vane when the damper is closed, the sealing strip having an attachment portion (30) of generally U-shaped configuration for engaging the flange of a vane, the generally U-shaped configuration having a pair of spaced legs (35, 36), and a sealing lip (46) projecting from one of the legs for contacting the planar engaging portion (48) of an adjacent vane during closure of the damper.

10 Claims, 2 Drawing Sheets

SEALING STRIP FOR DAMPER SYSTEM

TECHINAL FIELD

The present invention relates generally to sealing devices for use in conjunction with dampers. More particularly, the invention relates to a sealing strip which is employed in conjunction with dampers of the type employed in conjunction with ventilating systems. More particularly, the invention relates to a sealing strip which may be readily attached to a vane of a ventilation damper for purposes of effecting an air-tight seal between each vane and an adjacent vane of a plurality of pivotal vanes.

BACKGROUND ART

It is well known in the heating, cooling, and ventilating industry that outside air must be introduced into a building to eliminate contaminants and odors, at least in commercial environments, during periods of high occupancy or the industrial production of contaminants. Large industrial dampers are provided to meet these requirements and must be of substantial size to handle elimination of the maximum of contaminants which may be produced at any time. Commonly such ventilation systems have control systems which intermittently open and close the outside air dampers in order to provide sufficient outside air to adequately dilute the contaminants inside a building; however, during time periods when an industrial building is unoccupied or the creation of contaminants is relatively low, the control system is designed to close the outside air dampers.

Most industrial dampers consist of vanes having a length of four feet and a width of approximately five inches. A vertical array of a sufficient number of vanes to close a ten to fifteen foot high opening of four foot width is not uncommon in industrial facilities of even moderate size. In some instances a plurality of such four foot wide arrays of dampers may be employed in order to achieve the ventilating capability required for a particular system depending upon the building size and the quantity and types of contaminants that are created.

For the most part these air dampers have a plurality of vanes which are pivotally mounted medially of the width thereof. A periphery of the width of the vanes characteristically has a flange formed therein for interfitting with a groove of an adjacent vane when the air damper is closed. The spaces between vanes and laterally thereof can commonly cause air leakage on the order of fifteen percent of the air input which would be experienced without the use of a damper seal. In many areas of the country where the outdoor night temperature averages on the order of 30° F. for approximately one-half of the year, the heating cost to offset the 15% air leakage can easily amount to thousands of dollars for even a moderate sized damper installation. When the pivots of the vanes or other mechanical components experience wear over a period of time larger spaces between vanes frequently permit even greater air leakage heat losses.

It has been found that by effecting a relatively efficient seal between the damper vanes the 15% air leakage can be reduced to an approximately 3–5% leakage rate. Such a 10–12% reduction in the air leakage rate of a damper translates to heating cost savings on the order of several thousand dollars per heating season for 80,000 to 100,000 cubic feet per minute air handling systems in many portions of the country.

In recognition of the potential savings in heating costs, some extent of effort has been directed toward the creation of more effective seals between vanes. In one form or another these efforts have been directed toward providing some type of sealing element in the grooves positioned at the periphery of the width of the vanes and particularly in the interfitting portions between the flanges and the grooves of adjacent vanes. In some instances a thin strip of foam has been cemented or bonded in the groove in order to effect engagement with the flange of an adjacent vane. In other instances sealing strips may be employed which are attached to an inside portion of the flanges and have a projecting member which extends between portions of the mating flange and groove to effect a sealing relationship. The projecting portions of such sealing strips may consist of a wiper like member or an enlarged bubble of foam or comparable material. In these instances the sealing strips are attached interiorly of the flanges and have the sealing element projecting into the mating groove area to effect a seal thereat.

While many damper sealing systems may be relatively effective when first installed, most are susceptible to significant operating problems after they have been subjected to an extent of usage and the outdoor environment. In many instances the operating system for the vanes may produce sufficient play such that the sealing strips are no longer totally effective. In other instances the deterioration of the seals may preclude the sealing engagement between the flange and groove so that the efficiency gains are no longer realized. In many instances, particularly where the sealing elements are cemented or bonded in place, the removal and replacement of the seals has proven to be a relatively difficult and expensive form of maintenance. No single sealing system employed to date has demonstrated an ability to have and maintain a high operating efficiency while being capable of easy removal and installation.

DISCLOSURE OF THE INVENTION

Therefore, an object of the present invention is to provide a sealing strip for damper vanes which effects an efficient seal over a long period of time irrespective of variations in a damper system normally producing air leakage. Another object of the invention is to provide a damper seal wherein the seal is effected at a location spaced from and therefore independent of the interengagement of the flange of the vane with the groove of an adjacent vane. Still another object of the invention is to provide a sealing system wherein the sealing strip effects a seal prior to total closure of the vanes such that the failure of the vanes to totally close due to mechanical wear at the pivots, to irregularities in the engaging surfaces, or to looseness in the vane actuation system does not preclude full sealing engagement by the sealing strips.

A further object of the invention is to provide a sealing strip which is applied to the outside of the vanes such that in the event of a damper communicating with the outdoors, the operation of wind blowing on the vanes produces an increased tendency for the vanes to be securely closed with the sealing strip more positively in engagement with the vane surface which it sealingly engages. Another object of the present invention is to provide a sealing strip which is oriented in such a manner that the sealing portion thereof and the sealing surfaces on the vanes are substantially protected when the vanes are open from the direct incidence of air flowing through the damper at high velocity which could produce the adherence and accumulation of dirt and other particulate matter present in the air. Yet another object of the invention is to provide a sealing strip which can be employed in conjunction with damper vanes having the pivot axes either horizontally or vertically mounted.

Yet another object of the invention is to provide a sealing strip which has an extended sealing surface to insure effective sealing despite circumstances where fly ash, dirt or other particles are present to some extent on the sealing strip or sealing surface of the vanes. Another object of the invention is to provide a sealing strip which has enlarged sealing areas and may be constructed of an elastomeric material which retains resilience in cold weather applications, such that an efficient seal is necessarily achieved even during the adverse conditions present during extremely cold weather. Still another object of the invention is to provide a sealing strip which can be readily installed on new or existing damper vanes and which can be readily removed and replaced in the event it becomes damaged or worn due to usage over a period of years. Yet another object of the invention is to provide a sealing strip for dampers which is relatively inexpensive to produce and maintain considering the substantial savings in heating costs and other efficiencies which may be realized.

In general, a sealing strip for a vertically disposed damper for the passage of air from a source to an output having a plurality of pivotal generally planar vanes with a groove at one periphery of the width thereof and a projecting flange at the other periphery of the width thereof, each flange interfitting with the grooves of an adjacent vane when the damper is closed, the sealing strip having an attachment portion of generally U-shaped configuration for engaging the flange of a vane, the generally U-shaped configuration having a pair of spaced legs, and sealing lip means projecting from one of the legs for contacting the planar engaging portion of an adjacent vane during closure of the damper.

PREFERRED EMBODIMENT FOR CARRYING OUT THE INVENTION

Figure 1:
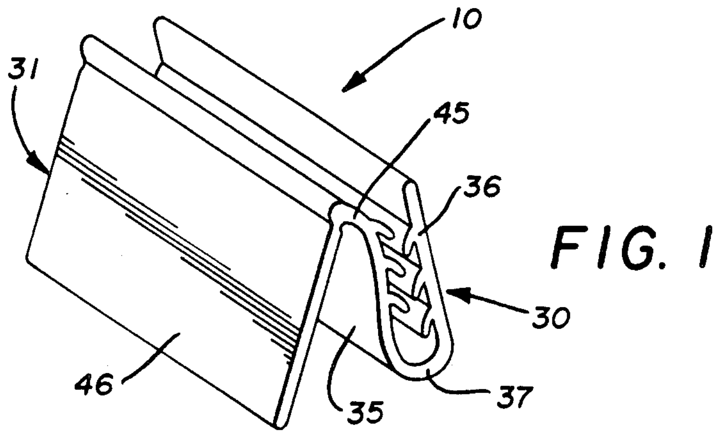
FIG. 1 is a perspective view of an extent of the sealing strip according to the concepts of the present invention shown demounted from a ventilation damper.
Figure 2:
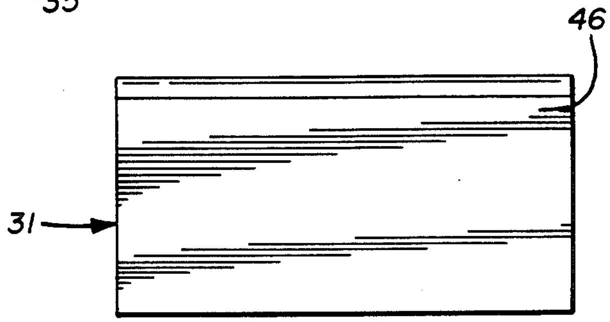
FIG. 2 is a front elevational view of the sealing strip of FIG. 1 showing particularly the sealing lip member.
Figure 7:
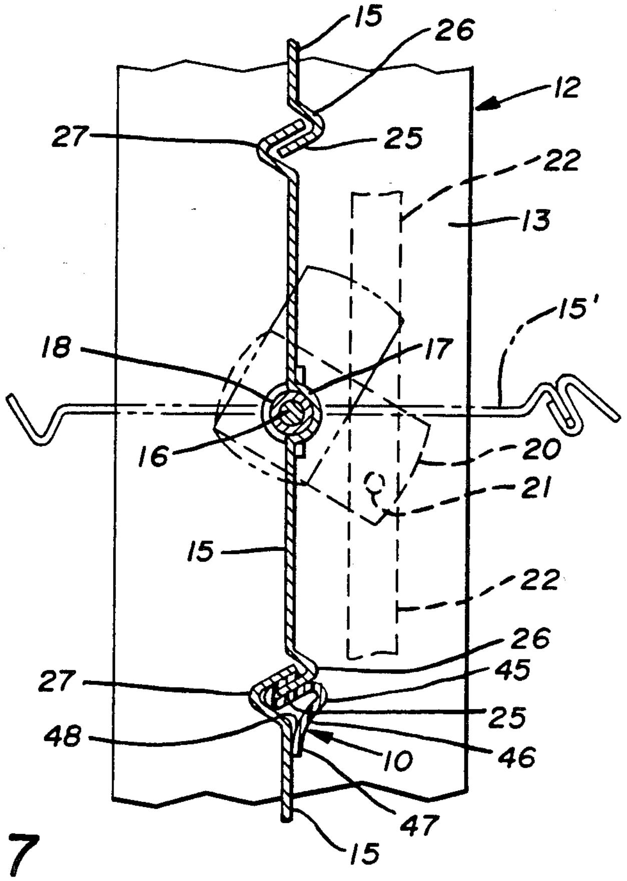
FIG. 7 is a fragmentary view of a portion of a ventilation damper assembly showing the damper vanes and sealing strip in section and portions of the damper vane operating elements in elevation, with the sealing strip shown attached to one damper vane and sealingly engaging an adjacent damper vane element.

A sealing strip for dampers according to the concepts of the present invention is generally indicated by the numeral 10 in FIG. 1 of the drawings. The sealing strip 10 is adapted for use in effecting seals between relatively movable members such as in the damper assembly, generally indicated by the numeral 12 in FIG. 7 of the drawings, which as shown is of a type commonly employed in conjunction with ventilating systems as will be appreciated by persons skilled in the art. The fragmentary showing of the damper assembly includes a peripheral frame 13 which would normally encompass the damper assembly rectangularly on all four sides. Mounted within the peripheral frame 13 are a plurality of vanes 15 which as shown are mounted about a horizontal shaft 16. The vanes 15 have a width extending in the vertical direction in FIG. 7 of commonly four to six inches and a substantial length of two feet, four feet or perhaps greater. The shaft 16 may be nonrotatably attached to a mating recess 17 in the vanes 15 as shown in FIG. 7. In such instance the shaft 16 may take the form of a stub shaft which is mounted in a bushing 18 affixed to the frame 13. It is, of course, to be appreciated that the shaft 16 could be a through shaft and that the shaft could be rotationally fixed with the vanes 15 journaled thereon.

In the damper assembly 12 shown, the vanes 15 rotate with shaft 16 such as to move the vanes 15 from the vertical solid line depiction of vanes 15 constituting the damper closed position to the horizontal chain line depiction of the vanes 15' constituting the damper open position, as seen in FIG. 7. This opening and closing of the vanes 15 is effected by the rotation of the shaft 16. As shown, the shaft 16 has a lever arm 20 which is affixed to the shaft 16 in a manner to effect concurrent rotation. The lever arm 20 has at a position preferably spaced from the shaft 16 a pivot pin 21 which mounts one or more throw rods 22. The throw rods 22 may be employed to interconnect lever arms 20 associated with each of the vanes 15. At one extremity of the damper assembly 12 a control or actuating mechanism such as a cylinder (not shown) may be employed to substantially linearly move the throw rods 22 as a group to simultaneously actuate all of the vanes 15 to move the damper assembly 12 between the depicted open and closed positions of the vanes 15 such as to permit the ingress or egress of air or to preclude air flow therethrough, respectively.

The vanes 15 normally have the recess 17 or other elements for mounting on shaft 16 positioned substantially medially of the width thereof as depicted in FIG. 7. One widthwise periphery of vane 15 has proximate the extremity an angularly directed flange 25. The flange 25 may be formed as part of a notch 26 or other configuration. Interengaging with the flange 25 at the bottom periphery of each of the vanes 15 as shown in FIG. 7 is a groove 27 formed in the top periphery of each next lower adjacent vane 15. This groove 27 is normally generally V-shaped. The flanges 25 are commonly constructed such that the elongate side surfaces thereof are spaced a distance from the surfaces of the groove 27, such as approximately 1/16 of an inch. While this clearance distance permits continuing interfit of the flange 25 with grooves 27 even after extensive wear of the vane actuating elements such as the bushing 18, pivot pin 21 or other elements, the clearance initially and increasingly with wear permits the possibility of substantial air leakage between the vanes 15 when damper assembly 12 is closed. A normal interfit of a conventional damper assembly 12 as between the flanges 25 and the grooves 27 is as depicted in the upper portion of FIG. 7.

Figure 3:
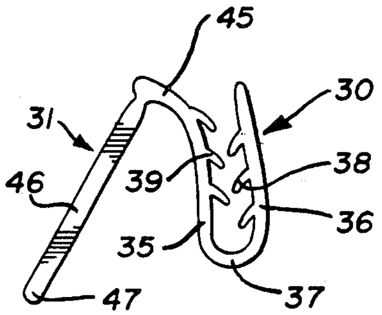
FIG. 3 is a side elevational view depicting the relationship of the sealing lip and the damper attachment member.
Figure 4:
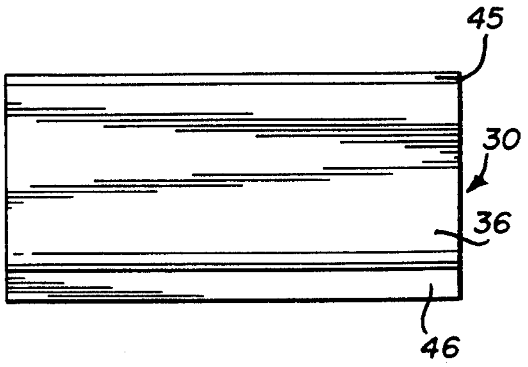
FIG. 4 is a rear elevational view showing particularly the damper attachment member.
Figure 5:
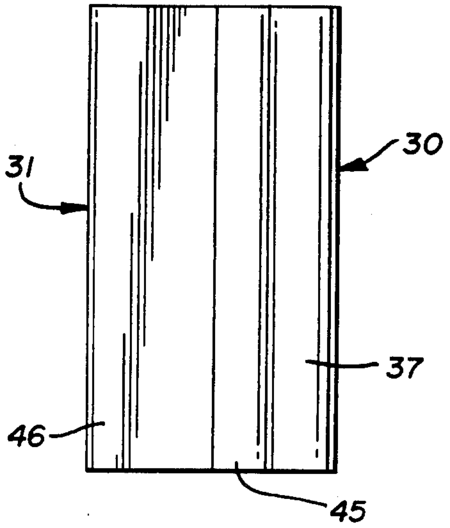
FIG. 5 is a bottom plan view of the sealing strip.
Figure 6:
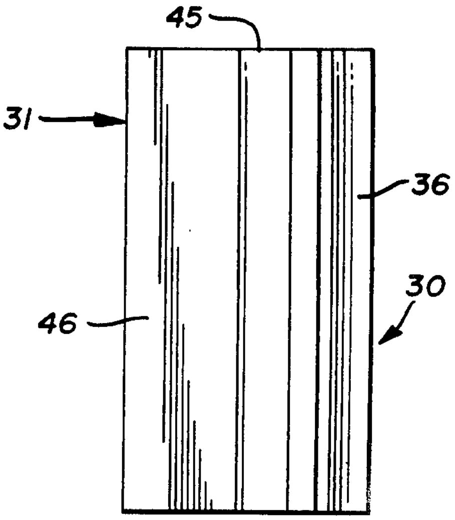
FIG. 6 is a top plan view of the sealing strip.

The use of a sealing strip 10 according to the present invention to effect a seal between adjacent vanes 15 is depicted in the lower portion of FIG. 7. The sealing strip 10 is attached to each of the flanges 25 of the vanes 15 and extends the length of the vanes. Referring now to FIGS. 1, 3 and 7, it can be seen that the sealing strip 10 is of a generally S-shaped crossectional configuration. The sealing strip 10 has an attachment portion, generally indicated by the numeral 30, and a sealing portion, generally indicated by the numeral 31. The attachment portion 30 is of a generally U-shaped configuration for engaging the extremity of a flange 25 of a vane 15. As shown, the attachment portion 30 has an outer leg 35 and an inner leg 36 which respectively overlie the outer and inner side surfaces of a flange 25 of a vane 15. The legs 35 and 36 are joined by a base or connector 37 to complete the U-shaped configuration of the attachment portion 30. In order to maintain a positive engagement between the legs 35 and 36 and the surfaces of flange 25, the legs 35 and 36 may converge in a direction proceeding away from the connector 37, the connector 37 spacing the lower portion of the legs 35 and 36 at least a distance equal to or greater than the thickness of the flange 25. The material, which is preferably a plastic such as polyvinyl chloride of the attachment portion 30 may advantageously be of such a thickness and composition that the connector 37 provides a spring biasing of the legs 35, 36 such that the interior surfaces thereof are urged into engagement with the surfaces of flange 25 when the legs have been separated for sliding attachment over the surfaces of the flange 25.

In order to further insure against possible accidental moving or dislodging of sealing strip 10 relative to vanes 15, the legs 35, 36 may be provided with one or more barbs 38 on the leg 36 and one or more barbs 39 on the leg 35. As shown by way of example, three barbs are provided on each of the legs 35, 36 directed inwardly toward the opposite leg. In order to resist any tendencies of the sealing strip 10 and particularly the attachment portion 30 to displace from flange 25, the barbs 38, 39 may be angled or otherwise directed downwardly toward the connector 37. In addition, one or more of the barbs 38, 39 may be positioned along the surfaces of each of the legs 35 and 36 such that they emanate from approximately laterally aligned positions, whereby their extremities are in substantial proximity medially of the space between legs 35 and 36. It will thus be appreciated that the barbs 38, 39 are readily displaced into close proximity to legs 35, 36 when a sealing strip 10 is mounted on a flange 25 but due to their extent and directivity resist demounting from the flange 25 until sufficient force is imparted to sealing strip 10 to overcome the additional frictional forces imparted by barbs 38, 39. For sufficiently resisting demounting while permitting reasonably facile mounting the barbs 38, 39 may advantageously be of thinner and more resilient material than the legs 35, 36.

The attachment portion 30 of sealing strip 10 has affixed to the upper extremity of one of the legs 35, 36 the sealing portion 31. The sealing portion 31 includes a spacer arm 45 which, as best seen in FIGS. 3 and 7, is an arcuate member extending a distance outwardly of the leg 35 of attachment portion 30 to a predetermined position. The spacer arm 45 has extending angularly thereto a projecting sealing lip 46. The lip 46 forms with the spacer arm 45 essentially a reverse curve such that the sealing lip 46 substantially parallels the legs 35, 36 thus giving sealing strip 10 an overall S-shaped configuration. It is advantageous that the spacer arm 45 be so configured that the sealing lip depart therefrom at an angle such that the sealing lip 46 and particularly the tip 47 thereof contact an engaging surface 48 constituting a portion of a vane 15 prior to the time that the vanes 15 reach the closed position of damper assembly 12 depicted in solid lines in FIG. 7 of the drawings. In this manner the sealing lip 46 upon full closure of the vanes 15 assumes the curved or slightly bowed configuration depicted in FIG. 7, as opposed to the substantially linear configuration of FIG. 3, upon the closure of the vanes 15 of the damper assembly 12. This result may be facilitated by making the sealing lip 46 of a thinner and more resilient material than the spacer arm 45 and legs 35, 36. Thus the sealing lip 46 is resiliently urged into contact with the engaging surface 48 of vanes 15 over a substantial portion of the width of and the entire length of the vanes 15.

It is also to be noted that the sealing lip in extending a substantial distance outwardly of the width-wise dimension of the vanes 15 effectively increases the surface area of the lower portion of the vanes 15 relative to the upper portion thereof. In instances where wind or other air turbulence operates on the vanes 15 exteriorly thereof, the greater surface area below the shaft 16 of vanes 15 tends to force the vanes into the closed position thereby maintaining the seal effected by sealing lip 47. It is to be noted that this advantageous result is achieved without substantially weight imbalancing the vane 15 with respect to its central pivot 16 in that the sealing strip 10 may be of a relatively light weight plastic material which is substantially less dense than the relative thick sheet metal of which damper assemblies including the vanes 15 thereof are normally constructed.

It is also to be noted that when the vanes 15 of the damper assembly 12 are actuated via the throw rods 22 to the open position depicted in chain lines in FIG. 7 that the undersurface of the tip 47 of sealing lip 46 which is the primary seal effecting surface of sealing strip 10 is essentially parallel to the vanes 15 at that time or directed slighly downwardly in respect thereto. In this manner the tip 47 is aligned with the air flow attendant opening of the damper assembly 12 or slightly protected therefrom. Thus, there is minimum tendency for dirt and other particulate matter frequently present in air flow passing from a source such as outdoors to a ventilation system output through the damper assembly 12 to adhere to or accumulate on the tip 47 or otherwise on sealing lip 46. This reduces the possibility of accumulations of dirt and other matter which could adversely affect the sealing efficiency of sealing strip 10 as it operates in conjunction with the sealing surface 48 of vanes 15 of damper assembly 12.

Thus, it should be evident that the sealing strip disclosed herein carries out the various objects of the invention set forth hereinabove and otherwise constitutes an advantageous contribution to the art. As will be apparent to persons skilled in the art, modifications can be made to the preferred embodiment disclosed herein, without departing from the spirit of the invention, the scope of the invention being limited solely by the scope of the attached claims.

We claim:

1. A sealing strip of S-shaped cross sectional configuration for a vertically disposed damper for the selective passage of air from a source to an output having a plurality of pivotal generally planar vanes with a groove at one periphery of the width thereof and a projecting flange at the other periphery of the width thereof, each flange interfitting with a groove of an adjacent vane when the damper is closed comprising, attachment means of generally U-shaped configuration for engaging the flange of a vane, said generally U-shaped configuration having a pair of spaced legs joined by a connector, having said spaced legs converging in a direction displaced from said connector and having gripping means positioned interiorly of said spaced legs for engaging the flange of a vane, and sealing means having an arm projecting from one of said legs and diverging from the other of said legs at an extremity displaced from said connector and having a flexible sealing lip normally extending linearly from and at an angle to said arm for contacting a planar engaging portion of an adjacent vane during closure of the damper, said sealing lip assuming a bowed configuration displaced away from said legs upon closure of the damper.

2. A sealing strip according to claim 1 wherein said sealing means is of a material and a thickness such as to have an extent of flexibility.

3. A sealing strip according to claim 1, wherein said sealing means emanates from a position spaced a distance outwardly of the projecting flange which said attachment means engages.

4. A sealing strip according to claim 1, wherein said sealing lip projects in a direction substantially paralleling said pair of spaced legs a substantially greater distance than the length of each of said pair of spaced legs.

5. A sealing strip according to claim 3, wherein said sealing means is of substantially uniform thickness and flexibility throughout the length thereof.

6. A sealing strip according to claim 5, wherein said sealing means is of sufficient length and angular disposition to sealingly contact the planar portion of an adjacent vane to the vane which said attachment means engages prior to the flanges interfitting with the grooves of an adjacent vane to complete closure of the damper.

7. A sealing strip according to claim 1, wherein said connector is arcuate.

8. A sealing strip according to claim 7, wherein said connector separates said pair of spaced legs a distance exceeding the thickness of the flange of a vane.

9. A sealing strip according to claim 1, wherein said gripping means consists of a plurality of barbs extending inwardly from said pair of spaced legs.

10. A sealing strip according to claim 9, wherein said barbs are directed toward the base of the U-shaped configuration of said attachment means to facilitate placement of said attachment means over the flange of a vane while resisting removal therefrom.

* * * * *